April 8, 1930.  L. BLOCH  1,753,684
TWO-WAY VALVE
Filed March 11, 1926
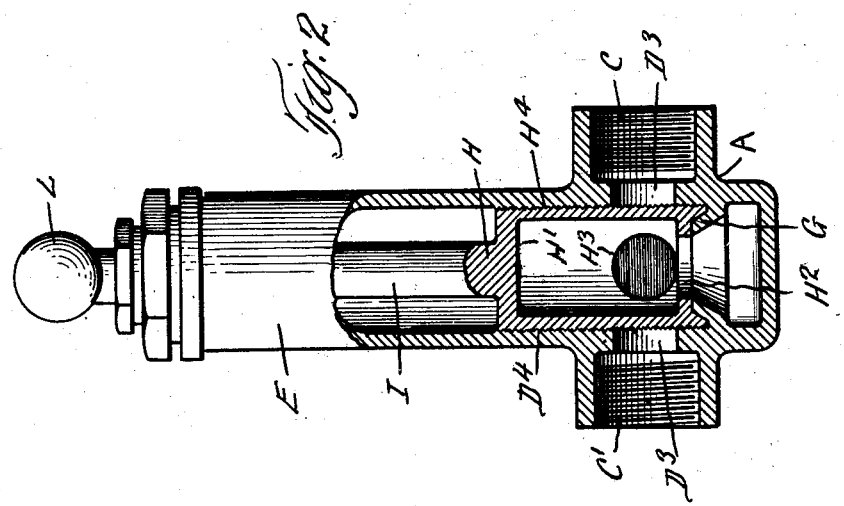
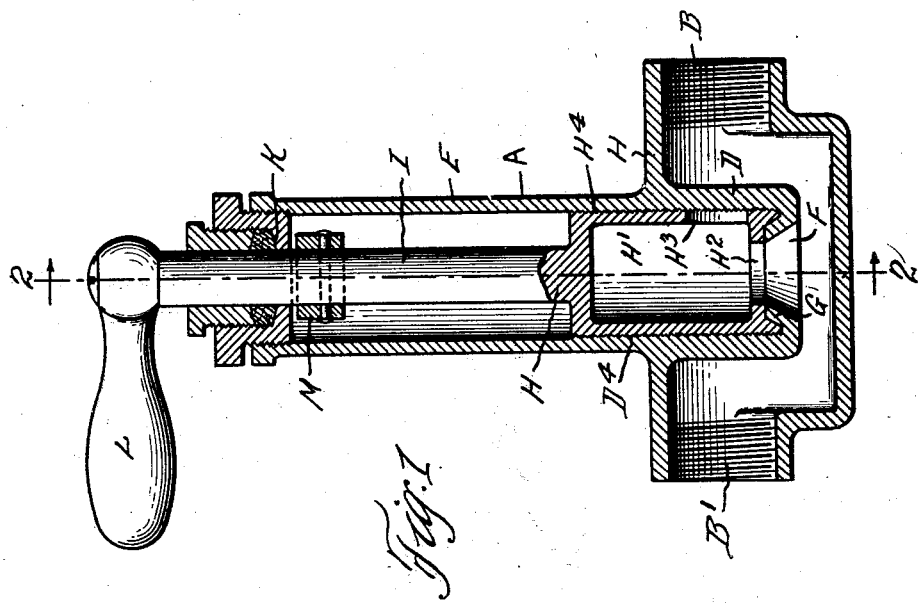
INVENTOR
Leon Bloch
By Hull, Birch & West
Attys.

Patented Apr. 8, 1930

1,753,684

UNITED STATES PATENT OFFICE

LEON BLOCH, OF CLEVELAND, OHIO, ASSIGNOR TO THE REPUBLIC BRASS COMPANY, OF CLEVELAND, OHIO, A CORPORATION OF OHIO

TWO-WAY VALVE

Application filed March 11, 1926. Serial No. 93,910.

This invention is a novel construction of valve particularly adapted for use in connection with bath fixtures, the object of the invention being to provide an exceedingly simple and cheap construction of two-way valve by means of which water can be directed to the tub or the shower or other diverse objects.

Another object of the invention is to provide a valve of this type which will be easily operable and with a minimum of movement. Other objects and advantages will appear as the description proceeds.

The invention consists in the novel features of construction and in the manner in which the same are combined or arranged all of which will be fully described hereinafter and set forth in the appended claims.

In the drawings forming a part of this specification Fig. 1 is a vertical sectional view of a valve constructed in accordance with my invention and Fig. 2 is a similar view taken on the line 2—2 of Fig. 1, being at right angles to the plane of the section of Fig. 1.

In constructing a valve in accordance with my invention I provide a casing A having the inlets B, B and the outlets C, C. The casing is formed with an integral cylindrical portion extending inwardly as indicated at D and outwardly as shown at E and at its inner end this cylindrical portion is formed with an opening F, and surrounding this opening is the annular abutment G.

Working in this cylindrical portion of the casing is the valve H having a stem I preferably integral therewith and extending through the usual type of gaskets and stuffing box K and provided with an operating handle L. The valve H is hollow as indicated at H' and has an inlet opening $H^2$ in the bottom thereof which is substantially co-extensive with the opening F and the end of the valve is shaped to fit snugly upon the annular abutment G. The valve is provided with a single outlet opening $H^3$. The valve H is externally threaded as shown at $H^4$ and the cylindrical portion of the casing is internally threaded as indicated at $D^4$, these threads being very fine so that upon turning of the valve it moves only a very slight distance longitudinally. A quarter turn of the valve will be sufficient to bring the opening $H^3$ into register with one of the openings $D^3$ and a continued movement of the valve will bring said opening $H^3$ into communication with the other opening $D^3$, but on account of the fine threads this three-fourth rotary movement will produce a very slight longitudinal movement of the valve.

In practice I prefer to put a stop collar M upon the stem I in such a position that it will contact with the stuffing box in the end of the cylindrical portion of the casing and arrest any further longitudinal movement of the valve. This collar can be threaded upon the stem or affixed thereto by means of a pin or any other suitable form of fastening device.

In the drawing I have illustrated the valve as entirely closed and in order to direct the water in one direction it is only necessary to give the valve a quarter turn and to direct it in the other direction it is only necessary to bring the opening $H^3$ opposite the other discharge opening.

The manner of arranging the valve in the cylindrical portion of the casing eliminates packing at this point and at the same time insures the proper operation of the valve with the minimum of longitudinal movement.

Having thus described my invention, what I claim is:

1. In a device of the kind described, a casing having a pair of inlet openings and a pair of outlet openings and a cylindrical portion having an opening in the lower end thereof, said opening being surrounded by an annular abutment, a hollow cylindrical valve arranged in said cylindrical portion and having an opening in the bottom thereof and also an opening in the side thereof, the end of said cylindrical valve being shaped to fit upon the abutment, a stem for operating said cylindrical valve, said valve having a screw thread engagement with the casing and whereby said valve can be rotated and moved longitudinally to bring the opening in the side of the valve into or out of register with either of the outlet openings in the casing, the longitudinal axes of the said inlet and outlet openings lying in substantially the same plane.

2. In a device of the kind described, a casing having a pair of inlet openings and a pair of outlet openings and a cylindrical portion extending into the casing and also laterally therefrom, the longitudinal axes of said pair of inlet openings and said pair of outlet openings lying in substantially the same plane, said cylindrical portion having an opening in the bottom thereof, said opening communicating with the casing intermediate the inlet openings, said cylindrical portion also having openings in the sides thereof registering with the outlet openings in the casing, the opening in the lower end of the cylindrical portion being surrounded by an annular abutment, and a hollow cylindrical valve fitting into the cylindrical portion of the casing and having both a rotary and a longitudinal movement therein, said valve having an opening in its lower end communicating with the opening in the lower end of the cylindrical portion and a single opening in the side of said cylindrical valve adapted to be brought into register with either one of the outlet openings in the sides of the cylindrical portion of the valve casing.

3. A diverter valve of the character described comprising a casing having a pair of inlet openings and a pair of outlet openings therein, the longitudinal axes of said inlet and outlet openings lying in substantially the same plane, said casing being also provided with an inwardly directed cylindrical portion having an opening in the inner end thereof, a hollow cylindrical valve having an opening in its inner end disposed so as to register with the opening in said cylindrical portion, said valve being also provided with an opening in the side wall thereof adapted to register with either of said outlet openings, cooperating means on said valve and casing whereby said valve may be rotated and moved longitudinally to bring the opening in the side wall of the valve into register with either of said outlet openings and means for operating said valve.

In testimony whereof, I hereunto affix my signature.

LEON BLOCH.